(12) United States Patent
Sharples et al.

(10) Patent No.: US 6,599,443 B1
(45) Date of Patent: Jul. 29, 2003

(54) FILM

(75) Inventors: Nicholas Sharples, Dorset (GB); Gabrielle Egan, Dorset (GB); Young Chung, Calabasas, CA (US); Zhiming Zhuang, Thousand Oaks, CA (US); Zili Li, Barrington, IL (US); Bruce K. Winker, Thousand Oaks, CA (US); Jane H. Hanamoto, Thousand Oaks, CA (US); David Coates, Dorest (GB)

(73) Assignees: Rockwell Technologies, LLC, Thousand Oaks, CA (US); Merck Patent GmbH, Darmstadt (DE)

( * ) Notice: Subject to any disclaimer, the term of this patent is extended or adjusted under 35 U.S.C. 154(b) by 291 days.

(21) Appl. No.: 09/652,553

(22) Filed: Aug. 31, 2000

Related U.S. Application Data

(63) Continuation of application No. PCT/US99/04804, filed on Mar. 5, 1999.

(30) Foreign Application Priority Data

Mar. 5, 1998 (EP) .............................................. 98103864

(51) Int. Cl.⁷ .............................................. C09K 19/30
(52) U.S. Cl. ...................... 252/299.63; 428/1
(58) Field of Search ........................... 428/1.1, 1.2, 1.3, 428/1.31, 1.33, 1.53, 1.54, 1.55

(56) References Cited

U.S. PATENT DOCUMENTS 6,262,788 B1 * 7/2001 Hanrahan et al. ........... 349/117

FOREIGN PATENT DOCUMENTS

| WO | WO 97/00843 | 1/1997 |
|----|-------------|--------|
| WO | WO 98/04651 | 2/1998 |

OTHER PUBLICATIONS

Broer, Dirk J., et al., *Macromol. Chem.*, vol. 190, pp. 3201–3215 (1989).

* cited by examiner

*Primary Examiner*—Mark F. Huff
*Assistant Examiner*—Jennifer R. Sadula
(74) *Attorney, Agent, or Firm*—Ladas & Parry

(57) ABSTRACT

The invention relates to an optical retardation film comprising a layer of an anisotropic polymer material with an optical axis substantially parallel to the plane of the layer. The invention furthermore relates to a process of preparing the optical retardation film, to the use of such an optical retardation film in liquid crystal displays, and to a liquid crystal display device comprising a liquid crystal cell and such an optical retardation film.

12 Claims, No Drawings

FILM

"This application is a Continuation of PCT Application No. PCT/US99/04804, filed on Mar. 5, 1999, which PCT Application claims priority to EP Application No. 98103864.9, filed Mar. 5, 1998."

The invention relates to an optical retardation film comprising a layer of an anisotropic polymer material with an optical axis substantially parallel to the plane of the layer, said optical retardation film being obtainable by a process comprising the following steps A) coating a polymerizable mesogenic composition essentially consisting of
  a) 10 to 50% by weight of one or two polymerizable mesogenic compounds of formula Ia and 5 to 35% by weight of one or two polymerizable mesogenic compounds of formula Ib

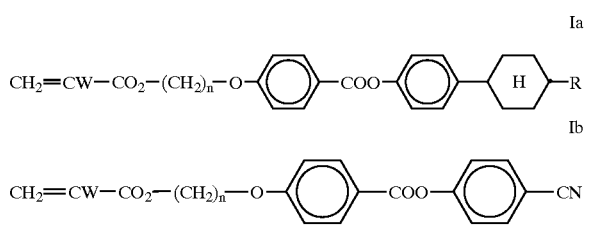

wherein
  W is H or $CH_3$,
  n is an integer from 3 to 6, and
  R is alkyl or alkoxy with 1 to 8 C atoms,
  b) 15 to 60% by weight of a polymerizable mesogenic compound of formula II

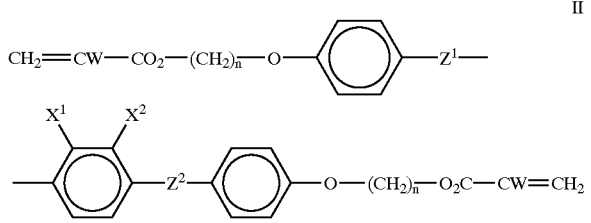

wherein
  W is H or $CH_3$,
  n is an integer from 3 to 6,
  $Z^1$ and $Z^2$ are each independently —COO— or —OCO—, and
  $X^1$ and $X^2$ are each independently H or $CH_3$, and
  c) 0.1 to 8% by weight of a photoinitiator, said mixture optionally being dissolved in an organic solvent in a concentration of up to 50% by weight, on a substrate in form of a layer,
B) aligning the polymerizable mesogenic composition into a homogeneous orientation,
C) polymerizing the polymerizable mesogenic composition by exposure to UV light, and
D) optionally removing the substrate from the polymerized material,
  characterized in that
  I) 50 to 2500 ppm of a mixture of non-ionic fluoroalkyl-alkoxylate surfactants selected from the following formulae $$C_nF_{2n+1}SO_2N(C_2H_5)(CH_2CH_2O)_xCH_3 \quad \text{III}$$

$$C_nF_{2n+1}(CH_2CH_2O)_xH \quad \text{IV}$$

with n being an integer from 4 to 12 and x being an integer from 5 to 15,
  are added to the polymerizable mesogenic composition prior to or during step A) of said process, and
  II) a PET or TAC film is used as the substrate onto which said polymerizable mesogenic composition is coated in step A) of said process, and
  III) prior to step A) of said process the surface of said PET or TAC film adjacent to said polymerizable mesogenic composition is rubbed unidirectionally or is covered by a polyimide layer which is rubbed unidirectionally.

The invention furthermore relates to a process of preparing an optical retardation as described above, to the use of such an optical retardation film in liquid crystal displays, and to a liquid crystal display device comprising a liquid crystal cell and such an optical retardation film.

Optical retardation films are used for light modulation in various optical applications. For example, a quarter wave retardation film (QWF) can transform circularly polarized light into linearly polarized light. Furthermore, optical retardation films can be used as compensators to improve the optical properties of liquid crystal displays, such as the contrast ratio or gray scale at large viewing angles. For specific applications, birefringent optical films with an extraordinary optical axis parallel to the plane of the film are needed, which are also known as A-plates.

For use as A-plates, uniaxially stretched films of a pre-fabricated isotropic or LC polymer have been suggested in prior art. PCT International Application No. PCT/EP97/03676, which was published as WIPO International Publication No. WO 98/04651, describes an optical retardation film comprising a layer of anisotropic polymers material with an optical axis that has a low tilt angle relative to the plane of the layer, which is prepared by coating a polymerizable mesogenic mixture onto a substrate, aligning and curing the mixture.

However, when preparing such an optical retardation film it is often difficult to achieve planar alignment of the anisotropic polymer material with a low tilt angle between the optical axis and the plane of the film, especially with a tilt angle that is close to or substantially zero.

Thus, it is still desirable to have available an A-plate optical retardation film that can be used to improve the optical properties of a liquid crystal display, is easy to fabricate in large scale as a flexible film with a large area, and has an optical axis substantially parallel, with substantially zero tilt angle, to the plane of the film.

One of the aims of the present invention is to provide such an optical retardation film. Another aim of the invention is to provide a process of preparing such an optical retardation film. Other aims of the present invention are immediately evident to the person skilled in the art from the following detailed description.

It has been found that these aims can be achieved by providing an optical retardation film according to the present invention.

One object of the present invention is an optical retardation film comprising a layer of an anisotropic polymer material with an optical axis substantially parallel to the plane of the layer, said optical retardation film being obtainable by a process comprising the following steps A) to D) as described above.

Preferred embodiments of the present invention relate to
  an optical retardation film, wherein the tilt angle between the optical axis and the plane of the layer of said anisotropic polymer material is from 0 to 1 degrees.
  an optical retardation film obtainable by a process as described above, wherein said mixture of non-ionic fluoroalkyl-alkoxylate surfactants is comprising 50 to 2500, preferably 100 to 1200 ppm of at least two compounds of formula III.

an optical retardation film obtainable by a process as described above, wherein said mixture of non-ionic fluoroalkyl-alkoxylate surfactants is comprising 50 to 2500, preferably 800 to 1800 ppm of at least two compounds of formula IV.

an optical retardation film obtainable by a process as described above, wherein in the compound of formula II $X^1$ is H, $X^2$ is $CH_3$, $Z^1$ is —COO— and $Z^2$ is —OCO—.

an optical retardation film obtainable by a process as described above, wherein in the compounds of formula Ia, Ib and II W is H.

an optical retardation film obtainable by a process as described above, wherein in step A) of said process a PET film is used as a substrate, the surface of which being adjacent to the polymerizable mesogenic composition is rubbed unidirectionally prior to step A).

Another object of the present invention is a process of preparing an optical retardation film comprising a layer of an anisotropic polymer material with an optical axis substantially parallel to the plane of the layer, wherein said process comprises steps A) to D) as described above and below.

Another object of the present invention is the use of an optical retardation film as described above and below in liquid crystal displays.

Yet another object of the present invention is a liquid crystal display device comprising a liquid crystal cell and an optical retardation film as described above and below.

The retardation of the inventive optical retardation film is preferably ranging from 20 to 600 nm. Particularly preferred are films with a retardation from 25 to 170 nm, furthermore films with a retardation from 300 to 600 nm.

The optical retardation film according to the present invention is suitable for use as phase retarder or as compensator in electrooptical displays, in particular for displays based on the twisted nematic (TN) effect, such as TN, STN (super twisted nematic), ECB (electrically controlled birefringence), OCB (optically compensated birefringence), DAP (deformation of aligned phases), VAN/VAC (vertically aligned nematic/cholesteric), OMI (optical mode interference), or SBE (super birefringence effect), including displays of the active and passive matrix type, furthermore in displays of the guest-host-type, the IPS (in plane switching) type, the ferroelectric or antiferroelectric type.

It is also possible, for example, to use an inventive optical retardation film as a QWF together with a broadband reflective polarizer, wherein the retardation of the optical retardation film is substantially 0.25 times the central wavelength of the wavelength band reflected by the reflective polarizer.

The inventive optical retardation film comprises a layer of a polymerized mesogenic material and is characterized by a significantly high birefringence. Furthermore, the optical properties of the optical retardation film, like e.g. the birefringence, can be controlled by variation of the type and ratio of the polymerizable mesogenic compounds in the polymerizable material.

The optical retardation film according to the present invention comprises a layer of an anisotropic polymer having a major optical axis that is substantially parallel to the plane of the layer. The tilt angle between the optical axis of said layer and the plane of said layer is preferably in the range from 0 to 1 degrees, in particular 0 to 0.5 degrees, very preferably from 0 to 0.3 degrees. Especially preferably the tilt angle is approximately 0 degrees.

The tilt angle of an inventive optical retardation film as referred to in the foregoing and the following is to be understood as the tilt angle through the entire film, which is an average of the tilt angles in different regions of the film. The tilt angle as such defined is not necessarily identical with the tilt angle at the outer surface, i.e. the air surface, of the film and/or with the tilt angle at the inner surface of the film, i.e. the surface adjacent to the substrate on which the film is prepared.

The inventive optical retardation film is obtainable by coating a polymerizable mesogenic composition on a substrate in form of a layer, aligning the material and polymerizing the aligned material.

As a substrate a PET (polyethyleneterephthalate) or TAC (triacetylcellulose) film is used. Especially preferably a PET film is used as substrate. PET films are commercially available e.g. from ICI Corp. under the trade name Melinex. TAC films are commercially available e.g. from Lonza AG (Switzerland) or Fuji Film (Japan).

In the inventive process, planar alignment in the coated layer of the polymerizable mesogenic composition, i.e. an orientation wherein the mesogenic molecules in the composition are aligned substantially parallel to the plane of the layer, with a low tilt angle relative to the plane of the layer, is particularly achieved by using a PET or TAC substrate, adding a surfactant to the polymerizable mesogenic composition rubbing the surface of the substrate or alternatively covering the substrate by a polyimide layer and rubbing said polyimide layer prior to coating the polymerizable composition onto the substrate The surfactants used in the inventive process are a mixture of non-ionic fluoroalkylalkoxylate surfactants selected from formula IIII and IV

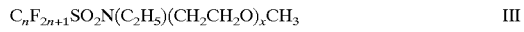

wherein n is an integer from 4 to 12 and x is an integer from 5 to 15. Upon using these surfactants it is possible to produce polymerized films with a very low tilt angle.

The surfactants of formula III are commercially available under the trade name Fluorad 171 (from 3M Co.), the surfactants of formula IV under the trade name Zonyl FSN (from DuPont).

The amount of surfactants is preferably from 500 to 2500 ppm, in particular from 1000 to 2500 ppm, very preferably from 1500 to 2500 ppm.

In addition to the above mentioned means to achieve low tilt angle, the alignment quality is also depending on the rubbing angle, i.e. the angle between the major rubbing direction and the major optical axis of the substrate or the polyimide layer respectively. Preferably rubbing is carried out unidirectionally in a direction substantially parallel to the major optical axis of the substrate.

For example rubbing can be achieved by means of a rubbing cloth or with a flat bar coated with a rubbing cloth, or by means of a rubbing roller, like e.g. a fast spinning roller that is brushing over the substrate, or by putting the substrate between two rollers, wherein in each case one or both of the rollers are optionally covered with a rubbing cloth.

It is also possible to carry out rubbing by wrapping the substrate at least partially at a defined angle around a roller that is coated with a rubbing cloth.

As rubbing cloth all materials can be used that are known to the skilled in the art for this purpose. For example velvet of a commercially available standard type can be used as a rubbing cloth.

The ability of a substrate to induce alignment in the polymerizable mesogenic composition coated on this substrate after rubbing the substrate will further depend on the process parameters of the rubbing process, like the rubbing pressure and rubbing speed and, in case a rubbing roller is used, on the rotational velocity of the roller, the rubbing roller circumference and the tension on the substrate.

The rubbing length in the rubbing process according to the above described preferred embodiments is preferably from 0.2 to 5 meters, in particular from 0.5 to 3 meters, most preferably from 1.0 to 2.5 meters.

The polymerizable mesogenic composition is cured by photopolymerization, carried out by exposing the composition to UV light in the presence of a UV-absorbing photoinitiator, which decomposes under UV irradiation to produce free radicals that start the polymerization reaction.

Polymerization can be carried out under air or in an inert gas atmosphere, e.g. in a nitrogen atmosphere. For curing in air e.g. the commercially available photoinitiator Irgacure 906 can be used, whereas for curing under a nitrogen atmosphere e.g. the commercially available Irgacure 651 or 184 (all from Ciba Geigy AG) would be suitable.

The amount of photoinitiator in the polymerizable mesogenic composition is 0.1 to 8%, preferably 0.5 to 6%, very preferably 1 to 5% by weight of the total mixture.

The polymerizable mesogenic composition is preferably dissolved in an organic solvent before being coated onto the substrate. Suitable solvents are organic solvents such as methyl ethyl ketone, toluene, cyclohexanone or cyclopentane, which are used preferably with a co-solvent such as xylene or isopropyl alcohol, or mixtures of two or more of these solvents.

To obtain polymer films with good alignment the polymerization has to be carried out in the liquid crystal phase of the polymerizable mesogenic composition. Preferably the curing temperatures is at least 40° C. below the clearing temperature of the polymerizable mesogenic composition. Especially preferred are curing temperatures from 30 to 60° C.

Preferably UV light of high or medium pressure is used, with the irradiation wavelength being from preferably from 250 nm to 420 nm, in particular from 320 nm to 390 nm.

As a source for actinic radiation for example a single UV lamp or a set of UV lamps can be used. When using a high lamp power the curing time can be reduced. The irradiance produced by the lamp used in the invention is preferably from 0.01 to 100 mW/cm², especially preferably from 10 to 50 mW/cm².

The curing time according to the invention is preferably not longer than 1 minute, especially preferably less than 30 seconds, very preferably less than 5 seconds.

The thickness of the inventive optical retardation film obtained by the method as described above is preferably 0.5 to 30 μm, in particular 0.5 to 20 μm, most preferably 0.5 to 15 μm.

The polymerizable mesogenic composition used to prepare the inventive optical retardation film is comprising the following polymerizable mesogenic compounds.

a) 10 to 50% by weight of one or two polymerizable mesogenic compounds of formula Ia and 5 to 35% by weight of one or two polymerizable mesogenic compounds of formula Ib

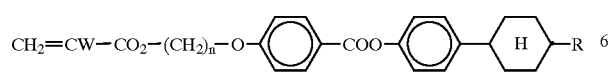

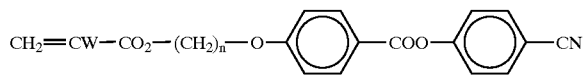

wherein
W is H or CH$_3$,
n is an integer from 3 to 6, and
R is alkyl or alkoxy with 1 to 8 C atoms, b) 15 to 60% by weight of a polymerizable mesogenic compound of formula II

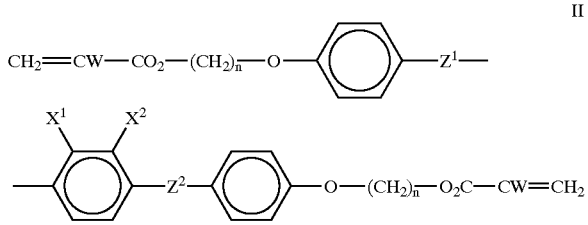

wherein
W is H or CH$_3$,
n is an integer from 3 to 6,
Z$^1$ and Z$^2$ are each independently —COO— or —OCO—, and
X$^1$ and X$^2$ are each independently H or CH$_3$, Preferably compositions are used comprising one compound of formula Ia, one compound of formula Ib and one compound of formula II.

R in formula Ia is preferably straight-chain alkyl.
W in formula Ia, Ib and II is preferably H.
In formula II preferably X$^1$ is denoting H and X$^2$ is denoting CH$_3$.

By varying the concentration of the difunctional mesogenic compounds of formula II and the monofunctional compounds of formula Ia and Ib, it is possible to influence the crosslink density of the polymer film. Thereby it is possible to control the properties of the film, such as the optical parameters and their temperature dependence, the glass transition temperature, the thermal and mechanical stability, and the solvent resistance.

The amount of compounds of formula Ia in the polymerizable mesogenic composition is preferably from 20 to 45%, in particular from 30 to 40% by weight of the total mixture.

The amount of compounds of formula Ib is preferably from 10 to 30%, in particular from 15 to 25% by weight of the total mixture.

The amount of compounds of formula II is preferably from 20 to 55%, in particular from 35 to 50% by weight of the total mixture.

The polymerizable mesogenic compounds of formula Ia, Ib and II can be prepared by methods which are known per se and which are described in the documents cited above and, for example, in standard works of organic chemistry such as, for example, Houben-Weyl, Methoden der organischen Chemie, Thieme-Verlag, Stuttgart. The compounds of formula II are described e.g. in D. J. Broer et al., Makromol. Chem. 190, 3201–3215 (1989). The compounds of formula Ia are described in the WO 97/00843.

Without further elaboration one skilled in the art can, using the preceding description, utilize the present invention to its fullest extent. The following examples are, therefore, to be construed as merely illustrative and not limitative of the remainder of the disclosure in any way whatsoever.

In the foregoing and in the following examples, unless otherwise indicated, all temperatures are set forth uncorrected in degrees Celsius and all parts and percentages are by weight.

EXAMPLE A—COMPARISON EXAMPLE

The following polymerizable composition is formulated.
Compound (1) 45%
Compound (2) 35%
Compound (3) 20%

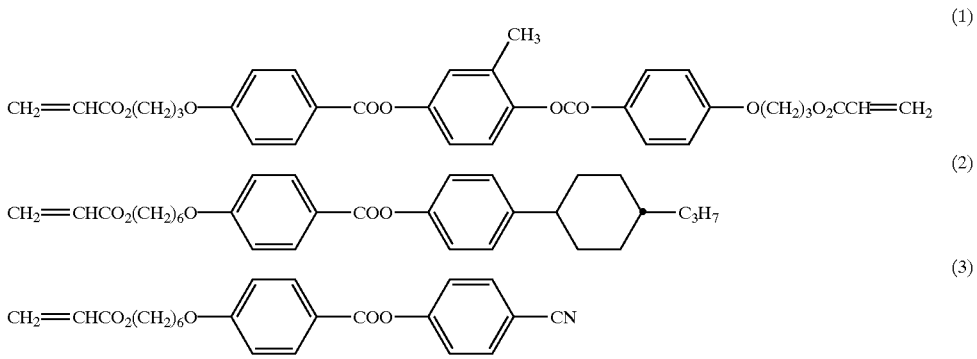

The compounds (1) to (3) can be prepared according to or in analogy to the methods described in D. J. Broer et al., Makromol. Chem. 190, 3201–3215 (1989) and in the WO 97/00843.

To this polymerizable composition 6% by weight of the radicalic photoinitiator Irgacure 906 (available from Ciba Geigy) are added. The polymerizable composition comprising the photoinitiator is then dissolved in a concentration of 20% by weight in an organic solvent mixture of 2:1:1 toluene/xylene/isopropyl alcohol. The solution is filtered to remove impurities and small particles.

Two sheets of PET (Melinex 401, available from ICI Corp.) are rubbed unidirectionally with a flat aluminium bar coated with velvet. The rubbing length is approximately 1000 mm for the first sheet and 2000 mm for the second sheet.

The solution is coated as a film with a thickness of approximately 12 μm on each of the above mentioned first and second PET sheets and the solvent is allowed to evaporate at 55° C. The mixture is then cured in air at 30 to 40° C. by irradiating with UV light with a wavelength of 360 and an irradiance of 20 mW/cm² for a few seconds. In this way, two polymer films 1A and 2A are obtained that can be used as optical retardation films.

Film A1 was obtained on the PET sheet with 1000 mm rubbing length and film A2 on the PET sheet with 2000 mm rubbing length.

EXAMPLE B

Two polymer films B1 and B2 are prepared as described in example A, with the difference being that 1000 ppm of the non-ionic fluorocarbon surfactant Fluorad FC171 (from 3M Co.) are added to the polymerizable composition in each case before dissolving the polymerizable composition in the organic solvent mixture.

Film B1 was prepared on a PET sheet with 1000 mm rubbing length and film B2 on a PET sheet with 2000 mm rubbing length.

USE EXAMPLE

The retardation R of the films A1, A2, B1 and B2 of examples A and B was measured at various angles of incidence θ with and against the rub direction in an Olympus polarizing microscope, using a Berek compensator. For this measurement, each film was removed from the PET substrates and glued to TAC substrates, which was then put on a glass slide. The results are depicted in table 1 below.

TABLE 1

| Retardation R (nm) at various angles of incidence θ | | | | | |
|---|---|---|---|---|---|
| θ → Sample | −40° | −20° | 0° | 20° | 40° |
| R (nm) → ↓  A1 | 68 | 65 | 49 | 31 | 19 |
| A2 | 89 | 75 | 59 | 39 | 22 |
| B1 | 111 | 132 | 139 | 130 | 113 |
| B2 | 117 | 136 | 141 | 139 | 119 |

The retardation R of an inventive optical retardation film, depending on the angle of incidence of the light θ and the tilt angle φ between the optical axis of the film and the plane of the film, can be expressed as the product of birefringence Δn and film thickness d according to equation (1)

$$R(\theta,\phi) = \Delta n(\theta,\phi) d \quad (1)$$

wherein $\Delta n(\theta\phi)$ is the birefringence of the film, which is defined as $$\Delta n(\theta, \phi) = \frac{n_e n_o}{(n_e^2 \sin^2(\theta + \phi) + n_o^2 \cos^2(\theta + \phi))^{1/2}} - n_o \quad (2)$$

with $n_e$ and $n_o$ being the extraordinary and ordinary refractive indices respectively of the polymerized mesogenic material.

The values of $n_e$ and $n_o$ can be measured using an Abbe refractometer, whereas the retardation $R(\theta,\phi)$ can be measured as described above at various angles of incidence θ.

Thus, for an inventive optical retardation film as described in example A and B with a given thickness d, the average tilt angle φ can be calculated from the measured retardation R, the incidence angle θ of light incident on the film and the measured values of $n_e$ and $n_o$ according to equations (1) and (2).

For the polymer films A1, A2, B1 and B2, $n_e$ is 1.64 and $n_o$ is 1.50, being measured in an Abbe refractometer. The measured values of R for various incidence angles θ are given in table 1. The resulting average tilt angles are given in table 2 below.

TABLE 2

Tilt angle φ of optical retardation films of example A and B

| Sample | A1 | A2 | B1 | B2 |
|---|---|---|---|---|
| Tilt Angle φ | 13° | 13° | <0.5° | <0.5° |

The above results clearly demonstrate that with the inventive process, which implies the use of a surfactant, an optical film can be prepared that exhibits a high quality of planar alignment of the polymerized mesogenic material, with the tilt angle being reduced almost to zero.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An optical retardation film comprising a layer of an anisotropic polymer material with an optical axis substantially parallel to the plane of the layer, said optical retardation film being obtainable by a process comprising the following steps A) coating a polymerizable mesogenic composition essentially consisting of
  a) 10 to 50% by weight of one or two polymerizable mesogenic compounds of formula Ia and 5 to 35% by weight of one or two polymerizable mesogenic compounds of formula Ib

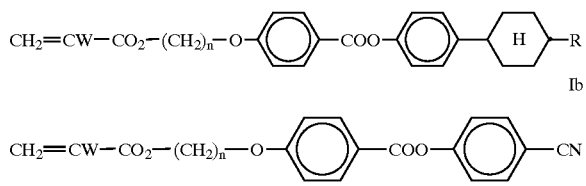

wherein
W is H or $CH_3$,
n is an integer from 3 to 6, and
R is alkyl or alkoxy with 1 to 8 C atoms,
  b) 15 to 60% by weight of a polymerizable mesogenic compound of formula II

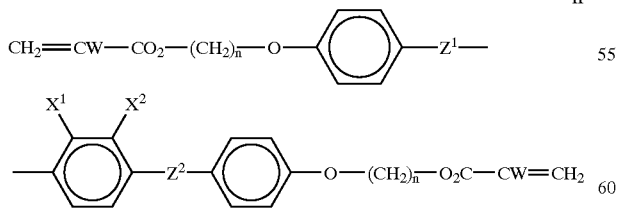

wherein
W is H or $CH_3$
n is an integer from 3 to 6,
$Z^1$ and $Z^2$ are each independently —COO— or —OCO—, and
$X^1$ and $X^2$ are each independently H or $CH_3$, and
  c) 0.1 to 8% by weight of a photoinitiator, said mixture optionally being dissolved in an organic solvent in a concentration of up to 50% by weight, on a substrate in form of a layer, B) aligning the polymerizable mesogenic composition into a homogeneous orientation, C) polymerizing the polymerizable mesogenic composition by exposure to UV light, and D) optionally removing the substrate from the polymerized material, characterized in that
I) 50 to 2500 ppm of a mixture of non-ionic fluoroalkyl-alkoxylate surfactants selected from the following formulae $$C_nF_{2n+1}SO_2N(C_2H_5)(CH_2CH_2O)_xCH_3 \quad\quad III$$

$$C_nF_{2n+1}(CH_2CH_2O)_xH \quad\quad IV$$

with n being an integer from 4 to 12 and x being an integer from 5 to 15,
are added to the polymerizable mesogenic composition prior to or during step A) of said process, and II) a PET or TAC film is used as the substrate onto which said polymerizable mesogenic composition is coated in step A) of said process, and III) prior to step A) of said process the surface of said PET or TAC film adjacent to said polymerizable mesogenic composition is rubbed unidirectionally or is covered by a polyimide layer which is rubbed unidirectionally.

2. An optical retardation film according to claim 1, characterized in that the tilt angle between the optical axis and the plane of the layer of said anisotropic polymer material is from 0 to 1 degrees.

3. An optical retardation film according to claim 1, characterized in that said mixture of non-ionic fluoroalkyl-alkoxylate surfactants is comprising 100 to 1200 ppm of at least two compounds of formula III.

4. An optical retardation film according to claim 1, characterized in that said mixture of non-ionic fluoroalkyl-alkoxylate surfactants is comprising 800 to 1800 ppm of at least two compounds of formula IV.

5. An optical retardation film according to claim 1, characterized in that in the compound of formula II $X^1$ is H, $X^2$ is $CH_3$, $Z^1$ is —COO— and $Z^2$ is —OCO—.

6. An optcal retardation film according to claim 1, characterized in that W in formula Ia, Ib and II is H.

7. An optical retardation film according to claim 1, characterized in that in step A) of said process a PET film is used as a substrate, wherein the surface of said PET film adjacent to the polymerizable mesogenic composition is rubbed unidirectionally prior to step A).

8. Process of preparing an optical retardation film as described in claim 1.

9. A liquid crystal display comprising an optical retardation film as claimed in claim 1.

10. A liquid crystal display device comprising a liquid crystal cell and an optical retardation film according to claim 1.

11. A film comprising a layer of an anisotropic polymer material with an optical axis substantially parallel to the plane of the layer, said film being obtainable by a process comprising the following steps A) coating a polymerizable mesogenic composition comprising:
a) 10 to 50% by weight of one or two polymerizable mesogenic compounds of formula Ia and 5 to 35% by weight of one or two polymerizable mesogenic compounds of formula Ib

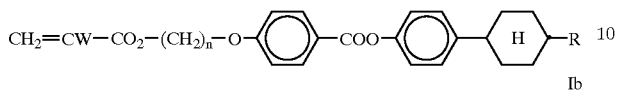

Ia

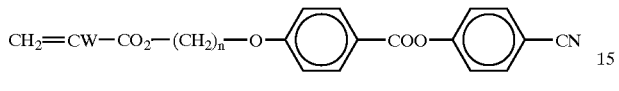

Ib wherein
W is H or CH$_3$,
n is an integer from 3 to 6, and
R is alkyl or alkoxy with 1 to 8 C atoms,
b) 15 to 60% by weight of a polymerizable mesogenic compound of formula II

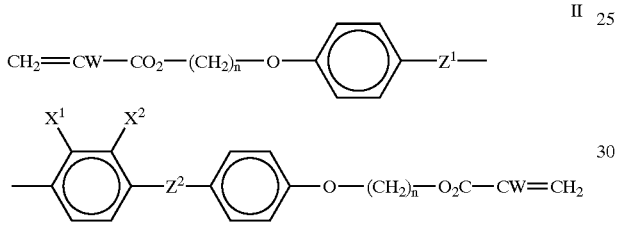

II wherein
W is H or CH$_3$
n is an integer from 3 to 6,
Z$^1$ and Z$^2$ are each independently —COO— or —OCO—, and
X$^1$ and X$^2$ are each independently H or CH$_3$, and
c) 0.1 to 8% by weight of a photoinitiator, said mixture optionally being dissolved in an organic solvent in a concentration of up to 50% by weight, on a substrate in form of a layer,
B) aligning the polymerizable mesogenic composition into a homogeneous orientation,
C) polymerizing the polymerizable mesogenic composition by exposure to UV light, and
D) optionally removing the substrate from the polymerized material,
wherein
I) 50 to 2500 ppm of a mixture of non-ionic fluoroalkyl-alkoxylate surfactants selected from the following formulae

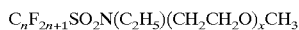 III

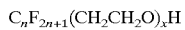 IV with n being an integer from 4 to 12 and x being an integer from 5 to 15,
are added to the polymerizable mesogenic composition prior to or during step A) of said process, and
II) a PET or TAC film is used as the substrate onto which said polymerizable mesogenic composition is coated in step A) of said process, and
III) prior to step A) of said process the surface of said PET or TAC film adjacent to said polymerizable mesogenic composition is rubbed unidirectionally or is covered by a polyimide layer which is rubbed unidirectionally.

12. A film being obtainable by a process comprising the following steps
A) coating a polymerizable mesogenic composition comprising:
a) 10 to 50% by weight of one or two polymerizable mesogenic compounds of formula Ia and 5 to 35% by weight of one or two polymerizable mesogenic compounds of formula Ib

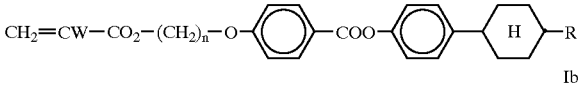

Ia

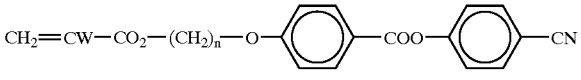

Ib wherein
W is H or CH$_3$,
n is an integer from 3 to 6, and
R is alkyl or alkoxy with 1 to 8 C atoms,
b) 15 to 60% by weight of a polymerizable mesogenic compound of formula II

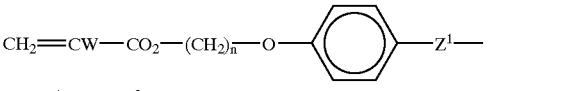

II wherein
W is H or CH$_3$
n is an integer from 3 to 6,
Z$^1$ and Z$^2$ are each independently —COO— or —OCO—, and
X$^1$ and X$^2$ are each independently H or CH$_3$, and
c) 0.1 to 8% by weight of a photoinitiator, said mixture optionally being dissolved in an organic solvent in a concentration of up to 50% by weight, on a substrate in form of a layer,
B) aligning the polymerizable mesogenic composition into a homogeneous orientation,
C) polymerizing the polymerizable mesogenic composition and
D) optionally removing the substrate from the polymerized material,
wherein optionally
I) 50 to 2500 ppm of a mixture of non-ionic fluoroalkyl-alkoxylate surfactants selected from the following formulae

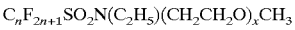 III

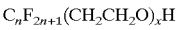 IV with n being an integer from 4 to 12 and x being an integer from 5 to 15,
are added to the polymerizable mesogenic composition prior to or during step A) of said process, and II) a PET or TAC film is used as the substrate onto which said polymerizable mesogenic composition is coated in step A) of said process, and
III) prior to step A) of said process the surface of said PET or TAC film adjacent to said polymerizable mesogenic composition is rubbed unidirectionally or is covered by a polyimide layer which is rubbed unidirectionally.

* * * * *